US00RE40836E

(19) United States
(12) Reissued Patent
Mankovitz

(10) Patent Number: US RE40,836 E
(45) Date of Reissued Patent: Jul. 7, 2009

(54) APPARATUS AND METHODS FOR PROVIDING TEXT INFORMATION IDENTIFYING AUDIO PROGRAM SELECTIONS

(76) Inventor: Roy J. Mankovitz, 24236 Park Granada, Calabasas, CA (US) 91302

(21) Appl. No.: 09/796,684

(22) Filed: Mar. 1, 2001

Related U.S. Patent Documents

Reissue of:
(64) Patent No.: 5,161,251
Issued: Nov. 3, 1992
Appl. No.: 07/737,211
Filed: Jul. 29, 1991

U.S. Applications:
(62) Division of application No. 07/657,477, filed on Feb. 19, 1991, now Pat. No. 5,134,719.

(51) Int. Cl.
*H04H 40/00* (2006.01)
*H04H 60/00* (2006.01)

(52) U.S. Cl. ..... 455/66.1; 455/154.1; 455/158.4; 455/183.2; 455/186.1; 455/156.1; 369/30.04; 369/32.01; 381/2

(58) Field of Classification Search ..... 455/66.1, 455/154.1, 156.1, 158.1, 158.2, 158.4, 158.5, 455/185.1, 186.1, 183.2, 66, 44, 45, 154.2, 455/39, 68; 369/30.04, 32.01, 47, 48; 381/2, 381/4, 6, 16; 360/72.1, 72.2
See application file for complete search history.

(56) References Cited

U.S. PATENT DOCUMENTS

| | | | | |
|---|---|---|---|---|
| RE17,023 E | | 7/1928 | Clement | |
| 3,764,747 A | | 10/1973 | Nakajima et al. | 179/7 R |
| 3,911,446 A | | 10/1975 | Albertini | 346/33 R |
| 3,922,607 A | | 11/1975 | Wysong | |
| 3,949,401 A | | 4/1976 | Hegeler et al. | |
| 4,138,647 A | * | 2/1979 | Wine | 455/154.2 |
| 4,252,995 A | | 2/1981 | Schmidt et al. | |
| 4,337,463 A | | 6/1982 | Vangen | 340/825.3 |
| 4,361,851 A | | 11/1982 | Asip et al. | 358/84 |
| 4,379,947 A | | 4/1983 | Warner | |
| 4,393,273 A | | 7/1983 | Claasen et al. | |
| 4,435,843 A | | 3/1984 | Eilers et al. | |

(Continued)

FOREIGN PATENT DOCUMENTS

| | | |
|---|---|---|
| GB | 2214739 | 9/1989 |
| JP | 64-068028 | 3/1989 |

OTHER PUBLICATIONS

47 CFR 73.319–73.322; 73.1570: 73.310. "Specification of the Radio Data System RDS for VHF/Fm Sound Broadcasting", *European Broadcast Union*, Tech. 3244–E, Mar. 1984, pp. 1–60.
Copy of the International Search Report for PCT/US1993/010037 mailed on Feb. 18, 1994.

*Primary Examiner*—Philip J Sobutka

(57) ABSTRACT

Apparatus and methods are disclosed for providing text information which identifies audio program selections, such as musical selections, stored on a compact disk (CD). Digital identification numbers encoded on the disk are provided by a compact disk player to a digital processor having a memory storage device. The identification numbers include an album identification number, and the track number selected for play. The memory storage device has stored therein text data identifying a plurality of program selections, organized by album and track identification number. The identification signals provided by the CD player are used to address the proper identifying text data for the selection being played. The identifying text data may be organized for radio broadcast along with the musical selection, and a receiver is used to display the data in text form to identify the musical selection as it is being reproduced.

53 Claims, 5 Drawing Sheets

U.S. PATENT DOCUMENTS

| | | | | | |
|---|---|---|---|---|---|
| 4,450,589 | A | | 5/1984 | Eilers et al. | |
| 4,485,483 | A | | 11/1984 | Torick et al. | |
| 4,499,601 | A | | 2/1985 | Matthews | |
| 4,528,643 | A | | 7/1985 | Freeny, Jr. | 364/900 |
| 4,534,054 | A | | 8/1985 | Maisel | |
| 4,538,285 | A | | 8/1985 | Gielis et al. | |
| 4,584,708 | A | | 4/1986 | Eilers et al. | |
| 4,592,546 | A | | 6/1986 | Fascenda et al. | 273/1 E |
| 4,602,380 | A | | 7/1986 | Stebbings | |
| 4,602,381 | A | | 7/1986 | Cugnini et al. | |
| 4,630,143 | A | | 12/1986 | Juso et al. | 360/72.2 |
| 4,679,238 | A | | 7/1987 | Marković | |
| 4,695,869 | A | | 9/1987 | Inoue et al. | 357/71 |
| 4,704,727 | A | | 11/1987 | Beard | |
| 4,718,106 | A | | 1/1988 | Weinblatt | 455/2 |
| 4,779,252 | A | | 10/1988 | Custers et al. | 369/32 |
| 4,788,682 | A | | 11/1988 | Vij et al. | 370/110.1 |
| 4,833,548 | A | * | 5/1989 | Watanabe | 358/342 |
| 4,847,886 | A | | 7/1989 | Chumley | 379/56 |
| 4,862,513 | A | | 8/1989 | Bragas | |
| 4,864,604 | A | | 9/1989 | Aihara | 379/110 |
| 4,870,515 | A | | 9/1989 | Stokes | 360/72.2 |
| 4,887,308 | A | * | 12/1989 | Dutton | 455/156 |
| 4,916,685 | A | * | 4/1990 | Endoh et al. | 369/47 |
| 4,920,432 | A | | 4/1990 | Eggers et al. | 360/33.1 |
| 4,943,963 | A | | 7/1990 | Waechter et al. | 370/94.1 |
| 4,953,039 | A | | 8/1990 | Ploch | 360/32 |
| 4,956,768 | A | | 9/1990 | Sidi et al. | 364/200 |
| 4,977,455 | A | | 12/1990 | Young | 358/142 |
| 4,989,234 | A | | 1/1991 | Schakowsky et al. | 379/92 |
| 4,996,679 | A | * | 2/1991 | Yoshino | 369/33 |
| 5,013,038 | A | | 5/1991 | Luxenberg et al. | 273/439 |
| 5,036,500 | A | | 7/1991 | Ganter | 368/47 |
| 5,063,610 | A | | 11/1991 | Alwadish | 455/45 |
| 5,073,931 | A | | 12/1991 | Audebert et al. | 380/23 |
| 5,081,680 | A | | 1/1992 | Bennett | 380/50 |
| 5,083,800 | A | | 1/1992 | Lockton | 273/439 |
| 5,119,503 | A | | 6/1992 | Mankovitz | |
| 5,119,507 | A | | 6/1992 | Mankovitz | 455/154.1 |
| 5,119,711 | A | | 6/1992 | Bell et al. | 84/622 |
| 5,120,076 | A | | 6/1992 | Luxenberg et al. | 273/439 |
| 5,127,303 | A | | 7/1992 | Tsumura et al. | |
| 5,131,311 | A | | 7/1992 | Murakami et al. | |
| 5,132,992 | A | | 7/1992 | Yurt et al. | 375/122 |
| 5,134,719 | A | | 7/1992 | Mankovitz | |
| 5,136,644 | A | | 8/1992 | Audebert et al. | 380/25 |
| 5,155,762 | A | | 10/1992 | Croquet et al. | 379/92 |
| 5,161,251 | A | | 11/1992 | Mankovitz | |
| 5,162,905 | A | | 11/1992 | Itoh et al. | 358/84 |
| 5,185,786 | A | | 2/1993 | Zwick | 379/201 |
| 5,189,630 | A | | 2/1993 | Barstow et al. | 364/514 |
| 5,191,573 | A | | 3/1993 | Hair | 369/84 |
| 5,193,134 | A | | 3/1993 | Pizzorno et al. | 385/105 |
| 5,194,683 | A | | 3/1993 | Tsumura et al. | |
| 5,214,792 | A | | 5/1993 | Alwadish | 455/45 |
| 5,216,703 | A | | 6/1993 | Roy | 379/59 |
| 5,233,438 | A | | 8/1993 | Funahai et al. | |
| 5,237,157 | A | | 8/1993 | Kaplan | 235/375 |
| 5,239,540 | A | | 8/1993 | Rovira et al. | |
| 5,247,126 | A | | 9/1993 | Okamura et al. | |
| 5,262,940 | A | | 11/1993 | Sussman | 364/403 |
| 5,262,964 | A | | 11/1993 | Bonsall et al. | 364/514 |
| 5,303,393 | A | | 4/1994 | Noreen et al. | 455/3.2 |
| 5,313,408 | A | | 5/1994 | Goto | 364/514 |
| 5,355,302 | A | | 10/1994 | Martin et al. | 364/410 |
| 5,357,505 | A | | 10/1994 | Tsumura et al. | 370/60 |
| 5,418,844 | A | | 5/1995 | Morrisey et al. | 379/207 |
| 5,428,610 | A | | 6/1995 | Davis | |
| 5,444,499 | A | | 8/1995 | Saitoh | 348/734 |
| 5,448,625 | A | | 9/1995 | Lederman | 379/67 |
| 5,455,823 | A | | 10/1995 | Noreen et al. | 370/50 |
| 5,457,739 | A | | 10/1995 | Le Cheviller | 379/93 |
| 5,469,431 | A | | 11/1995 | Wendorf et al. | 37/50 |
| 5,539,635 | A | | 7/1996 | Larson, Jr. | 364/401 R |
| 5,559,878 | A | | 9/1996 | Keys et al. | 379/265 |
| 5,570,295 | A | | 10/1996 | Isenberg et al. | 364/514 R |
| 5,572,442 | A | | 11/1996 | Schulhof et al. | 364/514 |
| 5,587,979 | A | * | 12/1996 | Bluthgen | 369/275.3 |
| 5,592,511 | A | | 1/1997 | Schoen et al. | 375/220 |
| 5,622,583 | A | | 4/1997 | Ernst et al. | 156/204 |
| 5,629,867 | A | | 5/1997 | Goldman | 364/514 R |
| 5,661,787 | A | | 8/1997 | Pocock | 379/101.01 |
| 5,675,734 | A | | 10/1997 | Hair | 395/200.1 |
| 5,689,081 | A | | 11/1997 | Tsurumi | 84/609 |
| 5,689,245 | A | | 11/1997 | Noreen et al. | 340/825.49 |
| 5,703,795 | A | | 12/1997 | Mankovitz | 364/514 R |
| 5,721,584 | A | | 2/1998 | Yoshinobu et al. | 348/13 |
| 5,734,119 | A | | 3/1998 | France et al. | 84/622 |
| 5,751,672 | A | | 5/1998 | Yankowski | 369/30 |
| 5,752,186 | A | | 5/1998 | Malackowski et al. | 455/414 |
| 5,758,286 | A | | 5/1998 | Leppanen | 455/445 |
| 5,759,101 | A | | 6/1998 | Von Kohorn | 463/40 |
| 5,774,534 | A | | 6/1998 | Mayer | 379/142 |
| 5,809,246 | A | | 9/1998 | Goldman | 395/200.47 |
| 5,815,814 | A | | 9/1998 | Dennison et al. | 455/456 |
| 5,835,583 | A | | 11/1998 | Hetz et al. | 379/220 |
| 5,857,149 | A | | 1/1999 | Suzuki | 455/186.1 |
| 5,864,804 | A | | 1/1999 | Kalveram | 704/233 |
| 5,867,155 | A | | 2/1999 | Williams | 345/327 |
| 5,867,780 | A | | 2/1999 | Malackowski et al. | 455/414 |
| 5,870,710 | A | | 2/1999 | Ozawa et al. | 704/500 |
| 5,880,386 | A | | 3/1999 | Wachi et al. | 84/601 |
| 5,886,274 | A | | 3/1999 | Jungleib | 84/601 |
| 5,887,308 | A | | 3/1999 | Walter | 14/73.1 |
| 5,892,171 | A | | 4/1999 | Ide | 84/622 |
| 5,900,564 | A | | 5/1999 | Kurakake | 84/477 R |
| 5,907,322 | A | | 5/1999 | Kelly et al. | 345/327 |
| 5,907,793 | A | | 5/1999 | Reams | 455/3.1 |
| 5,913,258 | A | | 6/1999 | Tamura | 84/604 |
| 5,963,916 | A | | 10/1999 | Kaplan | 705/26 |
| 5,987,525 | A | | 11/1999 | Roberts et al. | 709/248 |
| 5,991,737 | A | | 11/1999 | Chen | 705/26 |
| 6,031,795 | A | | 2/2000 | Wehmeyer | 369/30 |

* cited by examiner

APPARATUS AND METHODS FOR PROVIDING TEXT INFORMATION IDENTIFYING AUDIO PROGRAM SELECTIONS

Matter enclosed in heavy brackets [ ] appears in the original patent but forms no part of this reissue specification; matter printed in italics indicates the additions made by reissue.

CROSS REFERENCE TO PRIOR APPLICATIONS

This application is a division of my [co-pending] patent application Ser. No. *07*/657,477, filed Feb. 19, 1991 *now U.S. Pat. No. 5,134,719*, and entitled Apparatus and Methods for Identifying Broadcast Audio Program Selections in an FM Stereo Broadcast System.

BACKGROUND OF THE INVENTION

This invention relates to stereo radio broadcast systems and, more particularly, to apparatus and methods for identifying broadcast audio program selections in FM stereo radio broadcast systems.

While FM broadcast station program materials generally consist of a combination of music, news, advertising, and information programs, the interest of a large segment of the listening audience is directed to the music portion of the broadcasts. In fact, the music industry cooperates with the audio stations and encourages the broadcast of the latest album releases on the basis that most album sales are the result of audience reaction to broadcast musical selections.

One of the most frustrating aspects confronting the listener concerns the identification of the broadcast musical selections, particularly since the stations do not employ a uniform method of identification. Some stations announce the titles of a group of selections prior to their broadcast, others announce the titles after the broadcast of such a group, while still others provide such announcements on a random basis. Rarely do the stations announce the title, artist and album information for each selection. The result is that the listener is generally unable to rapidly identify and remember a particular musical selection with sufficient accuracy to enable the subsequent purchase of the album containing that selection.

Accordingly, it is an object of the present invention to provide apparatus and methods for enabling a listener to rapidly and accurately identify broadcast musical selections.

It is another object of the invention to provide apparatus and methods of storing selected musical selection identification information, and for recalling such information at a later time, to facilitate the purchase of the album containing that selection.

SUMMARY OF THE INVENTION

The foregoing and other objects of the invention are accomplished by providing a broadcast system which is compatible with conventional FM stereo receivers and which includes transmitter apparatus for transmitting audio musical selections and auxiliary data in the form of a digital message signal representing a text message which includes the name of the musical selection, the name of the artist performing the selection, and the name of the album on which the selection is located. The text message is transmitted either during, immediately prior to or immediately after the transmission of the musical selection.

Receiver apparatus receives the musical selection and the digital message signal. The musical selection is reproduced using loudspeakers and the like, and the message signal is decoded into the text message which is displayed on a display substantially concurrent with the reproduction of the musical selection.

A user operated storage feature is provided for storing the displayed text message, and for recalling it for display at a later time. In another embodiment, the storage feature also stores a portion of the musical selection along with the text message identifying that selection. Upon recall, the stored musical selection is reproduced while the stored message is displayed. Multiple text messages and corresponding musical selections may be stored and recalled by user operation of multiple control switches, which may be the same control switches used in a conventional digitally tuned receiver for storing and recalling broadcast station frequencies.

A system for transmitting the auxiliary data is also disclosed where the musical selections and auxiliary data are transmitted as part of an FM stereophonic broadcast system in which a main carrier is transmitted at an assigned broadcast station frequency. An audio sum signal is provided representing the sum of the left and right channels of the stereophonic audio programs, and a double sideband suppressed carrier (DSBCS) signal is provided where the suppressed carrier is amplitude modulated by an audio difference signal representing the difference between the left and right channels of the stereophonic audio programs, the frequency of the suppressed carrier being such that the frequency spectra of the DSBSC signal is spaced apart from and is above the frequency spectra of the audio sum signal.

A stereo pilot subcarrier is provided to demodulate the DSBSC signal in receiver apparatus, where the frequency of the pilot subcarrier is a subharmonic of the DSBSC suppressed carrier and is located between the frequency spectra of the audio sum signal and the DSBSC signal. Circuits are provided for amplitude modulating the stereo pilot subcarrier with the auxiliary data, and a modulator is used for frequency modulating the main carrier with the audio sum signal, the modulated stereo pilot subcarrier, and the DSBSC signal.

In one version of the above system, the auxiliary data is transmitted during the transmission of the stereo musical selections, and the stereo pilot subcarrier is amplitude modulated in a manner such that the frequency spectra of the modulated pilot does not overlap the frequency spectra of the audio sum signal or the frequency spectra of the DSBSC signal. When amplitude modulated with the auxiliary data, the stereo pilot subcarrier frequency modulates the main carrier from a minimum of 8% to a maximum of 10% of a predetermined maximum frequency modulation of the main carrier.

In another embodiment of the invention, the auxiliary data is transmitted during at least one time interval either before or after the transmission of the stereo musical selections. During that interval, which may be an interval of silence or in which audio announcements are transmitted, the left and right channels of the audio material being broadcast are set substantially equal to each other, forming a monophonic signal whereby the DSBSC signal is substantially unmodulated. The auxiliary data is transmitted during that interval by amplitude modulating the pilot subcarrier up to 100% with the auxiliary data, and the modulated subcarrier in turn frequency modulates the main carrier up to 30% of a predetermined maximum frequency modulation of the main carrier.

In another version of the above embodiment the auxiliary data is again transmitted during at least one monophonic time interval either before or after the transmission of the stereo musical selections, when the DSBSC signal is substantially unmodulated. In this version, the stereo pilot subcarrier is not modulated with the auxiliary data. Instead, the stereo pilot subcarrier is suppressed during the monophonic transmission interval, and an auxiliary data subcarrier is provided having a frequency greater than the frequency of the stereo pilot subcarrier and less than or equal to the highest frequency of the DSBSC signal spectra, and which is amplitude modulated by the auxiliary data. The auxiliary data subcarrier frequency may be set equal to the frequency of the DSBSC suppressed carrier.

Also provided is a modulator for frequency modulating the main carrier with the audio sum signal, the stereo pilot subcarrier, the DSBSC signal, and the amplitude modulated auxiliary data subcarrier.

A receiver is disclosed for receiving the frequency modulated main carrier, and for using the amplitude modulation of the stereo pilot subcarrier (or the auxiliary data subcarrier) to provide the auxiliary data.

Also disclosed is a system for automatically providing an audio musical selection and a digital message signal representing a text message which includes the name of the musical selection, the name of the artist performing the selection, and the name of the album on which the selection appears. The system includes a compact disk player for playing a compact disk having multiple tracks each of which contains digitized musical data representing an audio musical selection.

The disk when played by the player providing in addition to the audio musical selection a track identification signal identifying the track being played, and a disk identification signal which uniquely identifies the disk from other compact disks. A digital processor is provided with a memory having stored therein a table which includes the disk identification signal along with the name of the artist performing the musical selections on that disk and the name of the album on which the selection appears. The table also includes the names of the musical selections contained on that disk along with the track on which each selection is contained.

The processor is responsive to the disk identification signal and the track identification signal from the player and uses those signals in conjunction with the stored table for determining the name of the performing artist, the name of the album, and the name of the musical selection, and for combining these names to form the digital message signal.

A method of identifying broadcast audio program selections is disclosed which includes the steps of receiving a plurality of broadcast audio program selections which are reproduced by audio transducer means; receiving a plurality of broadcast text messages, where each text message is received substantially concurrent with and identifies a corresponding one of the audio program selections; temporarily storing a broadcast text message while it is being received, in a manner where each received text message replaces the previously temporarily stored text message; selecting in response to a user storage command a text message and a portion of the broadcast audio program identified by the selected text message to be stored in a fixed manner where it is retained until selected for deletion by user action; storing the selected text message and the selected portion of the broadcast audio program until it is selected for deletion by user action; providing a display for displaying a text message; recalling the selected text message in response to a user recall command; and displaying the recalled message on the display.

A method for transmitting a plurality of stereophonic audio programs and auxiliary data is disclosed which includes the steps of transmitting a main carrier at an assigned broadcast station frequency; providing an audio sum signal representing the sum of the left and right channels of the stereophonic audio programs; providing a double sideband suppressed carrier (DSBSC) signal, where the suppressed carrier is amplitude modulated by an audio difference signal representing the difference between the left and right channels of the stereophonic audio programs, the frequency of the suppressed carrier being such that the frequency spectra of the DSBSC signal is spaced apart from and is above the frequency spectra of the audio sum signal; providing a stereo pilot subcarrier to be used to demodulate the DSBSC signal in receiver apparatus, where the frequency of the pilot subcarrier is a subharmonic of the DSBSC suppressed carrier and is located between the frequency spectra of the audio sum signal and the DSBSC signal; amplitude modulating the stereo pilot subcarrier with the auxiliary data; and frequency modulating the main carrier with the audio sum signal, the modulated stereo pilot subcarrier, and the DSBSC signal.

Another method is disclosed for stereophonically transmitting a series of stereophonic audio programs comprised of left and right channels, and auxiliary data, including the steps of providing monophonic intervals spaced between stereophonic audio programs, where the left and right channels are substantially equal; transmitting a main carrier at an assigned broadcast station frequency; providing an audio sum signal representing the sum of the left and right channels of the stereophonic audio programs; providing a double sideband suppressed carrier (DSBSC) signal, where the suppressed carrier is amplitude modulated by an audio difference signal representing the difference between the left and right channels of the stereophonic audio programs, the frequency of the suppressed carrier being such that the frequency spectra of the DSBSC signal is spaced apart from and is above the frequency spectra of the audio sum signal; providing during stereophonic transmissions a stereo pilot subcarrier to be used to demodulate the DSBSC signal in receiver apparatus, where the frequency of the pilot subcarrier is a subharmonic of the DSBSC suppressed carrier frequency and is located between the frequency spectra of the audio sum signal and the DSBSC signal; suppressing the stereo pilot subcarrier during at least one monophonic interval; providing during the at least one monophonic interval an auxiliary data subcarrier having a frequency greater than the frequency of the pilot subcarrier and less than or equal to the highest frequency of the DSBSC signal spectra; amplitude modulating the auxiliary data subcarrier by the auxiliary data; and frequency modulating the main carrier with the audio sum signal, the stereo pilot subcarrier, the DSBSC signal, and the amplitude modulated auxiliary data subcarrier.

Also disclosed is a method of identifying audio broadcast programs, including the steps of: providing an audio musical selection; providing a digital message signal representing a text message which includes the name of the musical selection and the name of the artist performing the selection; transmitting the digital message signal and the audio musical program, where the digital message signal is transmitted substantially concurrent with the transmission of the audio musical selection; receiving the audio musical selection and the digital message signal; decoding the digital message signal into the text message; reproducing the audio selection using audio transducer means; and displaying the text message substantially concurrent with the reproduction of the musical selection.

These and other objects, features and advantages of the invention will become apparent from a reading of the specification when taken in conjunction with the drawings in which like reference numerals refer to like elements in the several figures.

DESCRIPTION OF THE PREFERRED EMBODIMENTS

Several prior art systems have been developed for use with conventional FM stereo broadcast systems for the transmission and reception of data (hereinafter referred to as auxiliary data) which is not a part of the regularly broadcast stereophonic audio programs. In general, these systems employ one or more subcarriers which are transmitted in a subcarrier band (generally referred to as the SOA band) which lies above the 53 kHz portion of the station bandwidth allocated to the transmission of conventional stereo audio signals. A variety of techniques are used to modulate these subcarriers to transmit auxiliary data which may be in the form of additional audio programs, or special announcements such as traffic conditions.

Examples of the above described systems are disclosed in U.S. Pat. Nos. 8,949,401; 4,435,843, 4,480,589; and 4,584,708, all assigned to Blaupunkt-Werke GmbH; and U.S. Pat. Nos. 4,252,995; 4,898,273; and 4,538,285, all assigned to U.S. Philips Corporation.

One drawback in these prior art auxiliary data transmission systems is that by using the SCA band for such use, they preclude the broadcast station from using that band for other uses such as the broadcast of background music, foreign languages, financial data, and the like, all of which can provide substantial additional income to the station. Further, the use of this band poses substantial technical problems due to the low frequency modulation limits imposed for this band by FCC regulations, and due to the relatively high FM modulation frequencies required to operate in this band. These limitations result in a low signal-to-noise ratio, requiring complicated and expensive modulation and noise reduction circuitry. As shown below, the present invention overcomes these problems by using the stereo audio portion of the station broadcast band for transmission of the auxiliary data.

Figure 1:
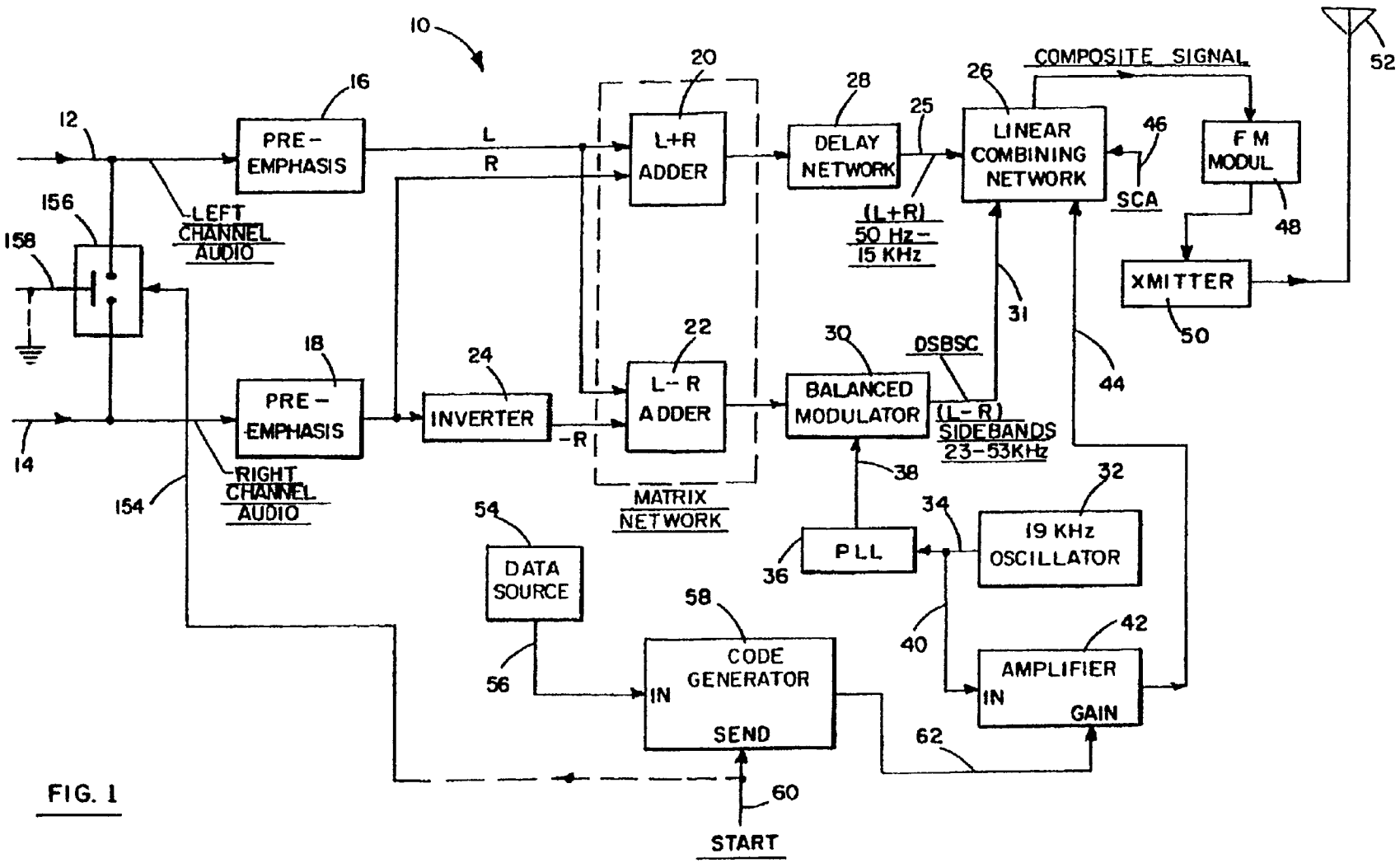
FIG. 1 is a functional block diagram of an FM stereo transmitter system constructed in accordance with the invention showing pulse amplitude modulation of the stereo pilot subcarrier to broadcast auxiliary digital data in addition to audio program material.

Referring to FIG. 1, there is shown a functional block diagram of an FM stereo transmitter system 10 constructed in accordance with the teachings of the invention. Left and right channel audio signals from a stereophonic audio source (such as a compact disc player or microphone) are provided on lines 12 and 14 to pre-emphasis networks 16 and 18, respectively. These networks add pre-emphasis and limit signal bandwidth to 50 Hz–15 kHz.

The signal from the network 16 is provided to an input terminal of adders 20 and 22 (which form part of a matrix network), while the signal from the network 18 is provide to an input terminal of adder 20 and, through an inverter 24, to an input terminal of adder 22. The signal from the adder 20, representing a monaural signal in the form of a sum (L+R) of the left and right audio channels is provided on line 25 to an input terminal of a linear combining network 26 through a delay network 28. The signal from the adder 22, representing the difference (L−R) of the left and right audio channels, is provided to the input terminal of a balanced modulator 80. The output signal from the modulator 30 which, as described below, is in the form of a double sideband suppressed carrier (DSBSC) signal, is provided on line 81 to a second input terminal of the combining network 26.

A 19 kHz oscillator 32 provides a 19 kHz stereo pilot signal on line 84 to a phase locked loop (PLL) circuit 36 which uses the pilot signal to generate a phase synchronized 38 kHz signal on line 38. The signal on line 88 is provided as a carrier signal to the modulator SO which, in a well known manner, generates the DSBSC signal having a suppressed carrier at 38 kHz which is amplitude modulated by the L−R signal to form upper and lower sidebands, each having a 15 kHz bandwidth. Thus, the frequency spectra of the DSBSC signal extends from 23 to 53 kHz. The stereo pilot is used in receiver apparatus described below to demodulate the DSBSC signal.

The 19 kHz signal from the oscillator 32 is provided on line 40 to the input terminal of a variable gain amplifier 42, the output signal of which is provided as a stereo pilot subcarrier on line 44 to a third input terminal of the combining network 26. An optional SCA (Subsidiary Communications Authorization) signal is provided on line 46 to a fourth input terminal of the network 26. The SCA signal may include background music, foreign language, financial data and other generally commercial-free programming materials which are broadcast to subscribers having special receives.

The SCA band is generally limited to the 59.5 to 74.5 kHz portion of the broadcast channel.

The output signal from the combining network 26 is provided to an FM modulator 48 which is used to frequency modulate a main carrier provided by transmitter 50 to antenna 52 at the assigned broadcast station frequency. The combining network 26 is used in part to set the FM modulation levels produced by the various input signals. In accordance with the teachings of the invention, the gain settings of the variable gain amplifier 42 also affect the FM modulation levels produced by the 19 kHz stereo pilot subcarrier as described below.

FM broadcast station frequencies in the United States are in the band from 88 to 108 MHz. Each station is allocated a 200 MHz wide channel, and FM modulation levels of the various broadcast signals are referenced as a percent of a 75 kHZ frequency deviation, which is defined as the 100%, or maximum, FM modulation level. Hereinafter, reference to FM signal percent modulation levels are with respect to this 100% level.

Figure 2:
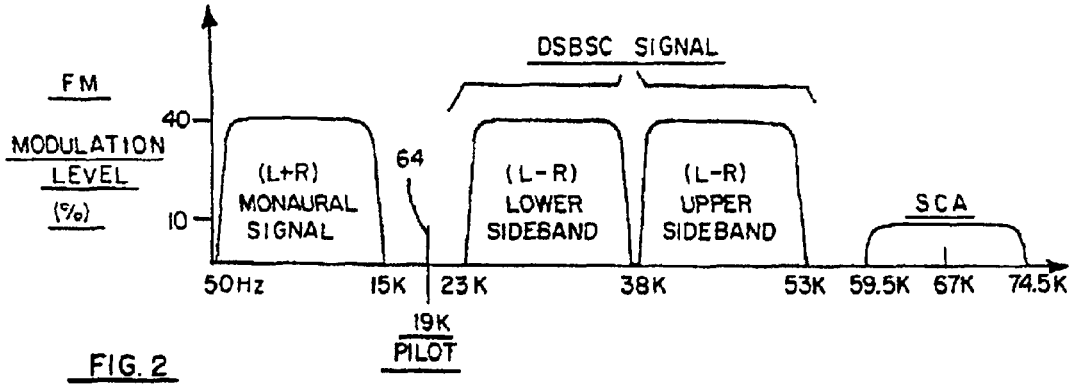
FIG. 2 is a graph showing the frequency spectra and relative modulation levels of the main station carrier in response to the various signals transmitted by the transmitter of FIG. 1 within the broadcast channel of an FM stereo broadcast station in accordance with a first embodiment of the invention.

The portion of the transmitter system 10 described thus far (excepting the operation of the variable gain amplifier 42) represents a conventional FM stereo broadcast system well known to those skilled in the art. FIG. 2 is a graph showing the frequency spectra and relative FM modulation levels (%) of the main carrier produced by the various signals previously described. The L+R monaural signal from line 25 of FIG. 1 occupies the 50 Hz to 15 kHz spectra and FM modulates the main carrier up to a level of about 40%. The 19 kHz stereo pilot subcarrier FM modulates the main carrier at a nominal level of 9%, and is constrained by FCC regulations to the range of 8–10% during stereo broadcasts. The DSBSC signal from the line 31 of FIG. 1 occupies the 23–53 kHZ spectra (±15 kHz about the 38 kHz suppressed carrier), and FM modulates the main carrier up to a level of about 40% during stereophonic broadcasts. The SCA signal from the line 46 occupies the 59.5–74.5 kHz spectra, and FM modulates the main carrier up to a level of about 10%.

Returning to FIG. 1, the following components are added to the conventional transmitter system described above to enable the broadcast of auxiliary digital data used to identify musical selections. A data source 54 is provided which produces a signal on line 56 which identifies a particular stereophonic musical selection provided on lines 12 and 14 for broadcast. The signal on line 56, which is preferably a digital signal, is provided to an input terminal of a code generator 58, the purpose of which is to arrange the input signal into a text message in the form of a pulse code sequence where the pulses are of a predetermined amplitude and frequency.

In response to a start signal appearing on line 60, the code generator 58 provides the pulse code sequence on line 62 to a gain control input terminal of amplifier 42 The amplifier 42 responds to the gain control signal by varying the amplitude of the 19 kHz signal provided on line 44 to the network 26. In effect, the pulse code sequence on line 62 in conjunction with the amplifier 42 provides pulse amplitude modulation (PAM) of the broadcast stereo pilot subcarrier.

Preferably, the text message is broadcast substantially concurrent with the broadcast of the musical selection which it identifies. The term "substantially concurrent" as used herein is meant to include substantially immediately prior to, during, or substantially immediately after the broadcast of the musical selection. By way of example but not limitation, the signal provided on line 56 by the data source 54 includes three items of information: the title, the name of the performing artist, and the name of the album corresponding to the musical selection to be identified. The generator 58 arranges this information into the form of a three-line text message suitable for display on three lines of a digital display which is included in receiver circuits described below.

By way of further example, each of the three items of information is allocated 24 characters. A six-bit ASCII code may be used to represent the characters. For a total of 432 character bits. Adding additional bits for start-of-message (SOM), end-of-message (EOM), carriage return, and error correction codes results in a requirement for about 500 bits of information to represent the entire message. Using pulse amplitude modulation of the stereo pilot subcarrier, these 500 bits are transmitted by the system 10 using 250 pulse code cycles as follows.

The steady-state gain of the amplifier 42 in the absence of a gain signal on the line 62 is set so that the 19 kHz stereo pilot signal on the line 44 FM modulates the main carrier at a 9% modulation level. In response to the start signal on the line 60, the generator 58 provides a sequence of pulses on the line 62 which represent the message corresponding to the data from the source 54. The pulse sequence preferably begins with an SOM code word, and ends with an EOM code word. The pulses, which are preferably in the form of binary ones and zeros, act to vary the gain of the amplifier 42, and thus the amplitude of the signal 44, Where by the stereo pilot signal FM modulates the main carrier in the range of 8 to 10% in response to these pulses. This modulation envelope is shown in the frequency spectra by dotted line 64 in FIG. 2, and is shown in the time domain by the graph of FIG. 3.

Figure 3:
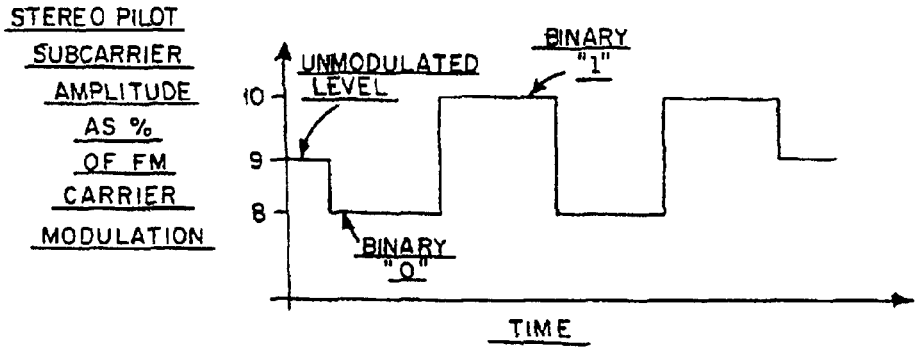
FIG. 3 is a graph showing the pulse amplitude modulation of the stereo pilot carrier in the time domain when used to transmit auxiliary digital data in accordance with the first embodiment of the invention.

In FIG. 3, the amplitude of the stereo pilot signal is shown as decreasing from a 9% FM modulation level to 8% in response to a pulse on the line 62 representing a binary zero, and increasing to a 10% level in response to a pulse on the line 62 representing a binary one. Accordingly, the pulses act to amplitude modulate the stereo pilot by an amount of about 11% AM modulation. The repetition rate at which the pulse sequence is provided on the line 62 is determined in part by the timing relationship between the broadcast of a musical selection and the broadcast of the message identifying that selection, as follows.

It is presumed that the broadcast station transmits a plurality of stereophonic musical selections which are separated from each other by an interval of silence of about one second or more, or are separated by audio announcements of much longer duration. The duration of most musical selections is generally one minute or more.

One protocol for broadcasting the digital message is to transmit it during the time the corresponding musical selection is being transmitted, where the message transmission begins at about the same time as the musical selection transmission begins. Using this protocol, it is desirable to minimize the AM modulation frequency of the stereo pilot signal to avoid AM sideband disturbance to receiver circuits (described below) which use that signal to demodulate the L−R signal. This can be accomplished by transmitting the message at a low data rate over an interval of, for example, 25 seconds. This interval is sufficiently short to permit the entire message to be transmitted before the end of the musical selection which it identifies. The 25 second interval yields a pulse rate of 10 Hz to transmit the 250 pulse cycles constituting the message. It is envisioned that this low frequency will not interfere with conventional receiver operation relating to stereophonic signal reception.

Another protocol for broadcasting the digital message is to transmit it during the interval of silence immediately preceding or following the musical selection to be identified.

Using this protocol, it is envisioned that the message would be transmitted within approximately one second. A higher message transmission data rate can be used during this interval of silence because minor disturbances in the demodulation function of the stereo pilot signal in the receiver can be tolerated due to the fact that no audio signals are being received.

From FIG. 2, it will be seen that the stereo pilot is separated from the audio signals by a 4 kHz band, and it is desirable to keep the stereo pilot AM sidebands well within this band between the L+R and L−R signal spectra to avoid spurious tone generation in the receiver. Accordingly, a pulse repetition rate of, for example, 1 kHz may be chosen to transmit the digital message in 250 milliseconds, which is well within the interval of silence.

Figure 4:
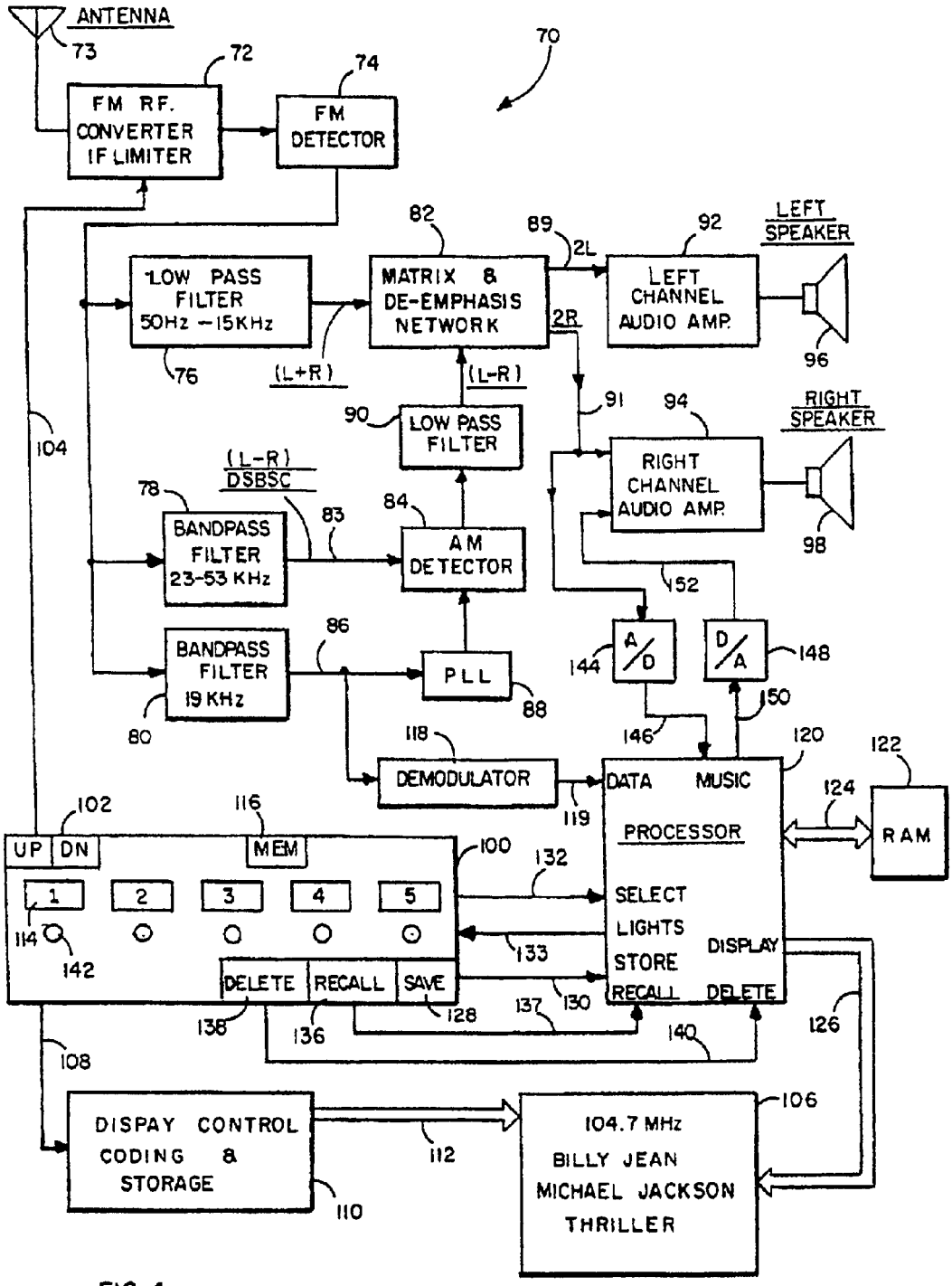
FIG. 4 is a functional block diagram of an FM stereo receiver constructed in accordance with the invention for receiving, displaying, storing and recalling the auxiliary digital data transmitted by the transmitter of FIG. 1.

Referring now to FIG. 4, there is shown a receiver system 70 which may be used to receive the stereophonic audio broadcasts as well as the digital message signals transmitted by the transmitter system 10. The system 70 includes conventional RF amplifiers, converter, IF amplifiers and limiter, (all shown in block 72) for receiving FM signals via antenna 73 in a standard FM receiver. The output signal from the block 72 is provided to an FM detector 74, the output of which is provided to filters 76, 78 and 80. The filter 76 is a 50 Hz–15 kHz low pass filter for extracting the monaural L+R signal from the received composite signal. The L+R signal is provided to an input terminal of a matrix and de-emphasis network 82.

The filter 78 is a 25–53 kHz bandpass filter for extracting the DSBSC L−R signal from the received composite signal. The L-R signal is provided on line 83 to a signal input terminal of an AM detector 84. The filter 80 is a 19 kHz bandpass filter for extracting the stereo pilot signal from the received composite signal. The pilot signal is provided on line 86 to a phase locked loop (PLL) 88. In response thereto, the PLL 88 provides a 38 kHz signal which is synchronized to the phase of the pilot signal.

This 38 kHz signal is provided to a carrier input terminal of the AM detector 84. The output signal from the detector 84 is provided, through low pass filter 90 to another input terminal of the network 82. Output signals from the network 92 are provided to left and right channel audio amplifiers 92 and 94, respectively. Output signals from the amplifiers 92, 94 are used to drive audio transducers, which may be in the form of loudspeakers 96 and 98, respectfully.

A control panel 100 is provided which includes a variety of user operated controls including digital tuning controls. An up/down tuning switch 102 is used to change the tuning frequency of the receiver by providing a tuning signal on line 104 which is used to control the RF and converter circuits in the block 72 in the well known manner of a superheterodyne receiver. The switch 102 enables the user to scan up or down the FM band to select a desired broadcast station frequency.

The frequency to which the receiver is tuned is shown on a display 106 (which may be of the liquid crystal type) by providing a suitable frequency indicating signal on line 108 to an input terminal of display control, coding and storage circuits 110. The circuits 110 are used to code the incoming signals into display characters, and to store those characters until they are replaced by new ones in response to a change in the incoming signal. The stored characters are provided to the display 106 on bus 112. The display in FIG. 4 shows the receiver tuned to 104.7 MHz.

In addition to the switch 102, the panel 100 includes a plurality of switches 114 (labeled 1 through 5 in the Figure) which are used in conjunction with a memory switch 116 to store often used station frequencies. Storage is accomplished by tuning the receiver to the desired frequency using the switch 102, pressing the memory switch 116, and then pressing one of the switches 114 These steps act to store the tuned frequency in a storage location corresponding to the particular switch 114 actuated. Future actuation of the switches 114 acts to recall the previously stored station frequency, which is displaced on the display 106 and used to tune the receiver 70.

The operation of the receiver circuits described thus far for the reception of stereophonic audio signals is as follows. The receiver is tuned to the desired station frequency using the switches 102 or 114 as described above. The received signal is processed by the circuits 72 and 74, and separated by the filters 76, 78 and 80 into the L+R, L−R and stereo pilot signals, respectively. The stereo pilot signal is used to reconstruct the 38 kHz subcarrier, which is used by the AM detector 84 to demodulate the L−R signal. The L+R and L−R audio signals are combined by the matrix network 82 to form left and right audio signals on lines 89 and 91, which are amplified and reproduced by the elements 92, 94, 96 and 98 to produce stereophonic sound. The presence of the stereo pilot signal may be used to illuminate a stereo indicator light (not shown).

If the broadcast station is transmitting monophonically, the stereo pilot signal is generally not transmitted. In this event, the stereo indicator is extinguished, no L−R signal is present, and the matrix network 82 provides the monophonic L+R signal to the amplifiers and speakers to reproduce monophonic sound.

The receiver system 70 also receives and processes the auxiliary data (in the form of a digital message signal) transmitted by the system 10 as described above to identify musical selections broadcast and reproduced substantially concurrently therewith. This is accomplished by an amplitude demodulator 118 which receives at its input terminal from the filter 80 the stereo pilot signal, which is pulse amplitude modulated (PAM) with the digital message signal. The bandwidth of the filter 80 is set sufficiently wide to accommodate the PAM sidebands, Which may typically range from 10 Hz to 1 KHz, depending on the procedure used in broadcasting the message, as described above. Alternatively, a separate 19 kHz bandpass filter (not shown) may be employed between the detector 74 and the demodulator 118, if it is desired to maintain a very narrow bandwidth for the filter 80 in connection with the operation of the PLL 88.

The demodulator 118 may be configured in a variety of ways, one example of which is shown in FIG. 4.2.23 of the textbook entitled "Digital Communications". authored by John G. Proakis, McGraw-Hill, 1983 The output signal from the demodulator 118, which contains the pulse sequence representing the digital message, is provided on line 119 to a data input terminal of a digital processor 120, which is preferably in the form of a microprocessor. A non-volatile random access memory 122 is also connected to the processor 120 via bus 124. The memory 122 is of the type which retains data stored therein even upon removal of power from the remaining receiver circuits, using any of a plurality of well known techniques.

Upon receipt of an SOM code word on the line 119, the processor 120 begins storing the message in a temporary storage area which may be a part of the processor 120 This area is labeled temporary because subsequent received messages are automatically stored therein in place of previously received messages, as described below. Upon receipt of an EOM code word on the line 119, the processor 120 provides the message, corrected for errors using suitable error correction techniques, to the display 106 via a display output terminal and bus 126.

The display 106 is configured with four display lines. One line is used as described above to display tuning frequency in response to data from the circuits 110, which are preferably included as part of the processor 120. The additional three display lines are used to display the musical selection title, artist and album, respectively, in response to the signals on the bus 126. Upon receipt of a subsequent SOM code word, the processor 120 clears the temporary storage area and the three lines of the display, temporarily stores the new message in place of the previous message, and upon receipt of an EOM code word, displays that new message. Alternatively incoming messages may be displayed as they are being received, as opposed to being displayed after they are received.

From the above description, it may be seen that the receiver system 70 displays to the user a message identifying a musical selection broadcast and reproduced by the speakers 96, 98 substantially concurrent therewith. Further the system 10 used to transmit the message is compatible with existing FM stereo receivers in that it does not disturb the reception and processing of the stereophonic audio signals. This is so because such receivers are, for the most part, insensitive to the amplitude modulation of the stereo pilot signal within the limits described above. For example, while the PLL 88 uses the phase information from the received stereo pilot to reconstitute the 38 kHz carrier, it is relatively unaffected by amplitude changes in the pilot signal.

One limitation in the system 70 described above is that the user must observe the display 106 during the reception of the musical selection associated therewith in order to note the identifying information. First, this limitation poses a problem in automobile radios, where such action disrupts the drivers attention. Second, this limitation requires that the user remember or note in writing the identifying information if the intention is to purchase at a later time the album containing that selection.

This limitation is overcome in the present invention by providing a fixed storage function for storing selected messages for recall at a later time in response to user action. Thus, a SAVE button 128 is provided on the control panel 100, the actuation of which provides a store signal to an input terminal of the controller 120 via line 130. In response to this signal, the controller 120 acts to store the displayed message in a non-volatile portion of the memory 122 for later recall by the user. Multiple messages may be saved in this manner by combining the function of the switch 128 with the switches 114 as follows.

In order to save a message, the user actuates the SAVE switch 128 followed by one of the switches 114 used for storing and recalling station frequencies, as described above. Using this sequence of switch actuations, the processor 120 receives a select signal on line 132 representing a particular one of the switches 114 thus actuated, in addition to the store signal on the line 130. In response thereto, the processor 120 stores the displayed message in a memory location whose address correlates with the particular switch 114 actuated.

Thus, in the configuration shown, up to five separate messages may be stored by the user in separate locations in the memory 122. More messages may be accommodated by providing additional switches 114 on the panel 100. To recall a particular message at a later time, the user actuates a RECALL switch 136 provided on the panel 100, followed by the actuation of one of the switches 114. This action causes the processor 120, in response to a recall signal provided on line 137, and a select signal on line 132, to recall the selected message previously stored in the memory 122, and to display that message on the display 106.

Such stored messages may be repeatedly recalled until deleted by the user. Deletion is accomplished by actuating a DELETE switch 138 provided on the panel 100, followed by actuation of one of the switches 114. This action causes the processor 120, in response to a delete signal provided on line 140 and a select signal on line 132, to delete from the memory 122 the selected message.

Indicator lights 142 may be provided on the panel 100 adjacent each switch 114 to indicate which switch locations have messages stored in conjunction therewith. Thus, the user can see which locations are free for storage of additional messages. The lights 142 are controlled by the processor 120 via line 133. Further, an audio tone can be provided by the processor 120 to alert the user in the event a location is chosen for storage of a new message and that location already contains a previously stored message. In response to that tone, the user can select another location, or delete the previously stored message from that location. This procedure eliminates the accidental deletion of a previously stored message. The use of an audio tone also eliminates the need for the user to look at the display panel prior to storing messages. A suitable switching arrangement (not shown) can be implemented to suppress the display of incoming messages during the time when previously stored messages are being recalled.

It will be appreciated that the features described above eliminate the need for the user to memorize or note in writing messages of interest. They can be selected and stored, and then recalled and displayed at a later time such as just prior to purchase of the album. There are occasions, however, when upon later recall of a message, the user can no longer remember the melody and/or lyrics of the musical selection associated with that message. This is particularly true when a plurality of messages have been stored.

To overcome this problem, the system 70 includes apparatus for storing a portion of the musical selection along with the message identifying that selection. Referring to FIG. 4, an analog to digital (A/D) converter 144 is provided having an input terminal connected to, for example, line 91 to receive audio signals from one (left or right) of the stereophonic channels provided by the network 82. A digital output signal representing the received audio program is provided by A/D converter 144 on line 146 to a music input terminal of the processor 120. A digital to analog (D/A) converter 148 is provided having an input terminal connected via line 150 to a music output terminal of the processor 120, and having an analog output signal terminal connected via line 152 to a second audio input terminal of the amplifier 94.

The operation of this portion of the system 70 is as follows. Upon listening to a musical selection reproduced by the system 70, if the listener desires to save information concerning that selection, the switches 128 and 114 are actuated as described above. In response thereto, the processor substantially immediately begins storing in the non-volatile portion of the memory 122 the digital signals received on line 146 from converter 144, and continues the storage of such signals for a predetermined interval of time, for example, ten seconds. The processor also stores in an associated portion of the memory 122 the message corresponding to that musical selection. As stated above, the digital signals on the line 146 are a representation of the audio selection being broadcast. It has been found that ten seconds is generally a sufficient interval of time to enable the user to identify the lyrics and/or the melody of most musical selections.

Upon recall of the stored information using switches 136 and 114, the processor 120 provides the stored message to the display 106 and substantially simultaneously provides the digital signals previously stored from the converter 144 to the input terminal of the converter 148 on the line 150. The converter 148 converts these signals to an analog signal representing ten seconds of the musical selection, which are amplified by the amplifier 94 and reproduced by the speaker 98. In this manner, the user is able to recall both a portion of the musical selection and the message identifying that selection. Multiple such selections/messages may be stored, recalled and deleted using the switches 128, 136 and 138 in conjunction with the plurality of switches 114 as described above. A suitable switching arrangement (not shown) can be implemented to suppress the audio reproduction of received signals from the network 82 during the playback of the stored audio signals from the processor 120.

Three protocols were discussed in connection with the transmitter system 10 relating to the timing of the broadcast of messages with respect to the broadcast of the musical selections associated therewith. These protocols included the broadcast of the message during, prior to, and subsequent to the broadcast of the associated musical selection. It is presumed that when the message is broadcast during the broadcast of the musical selection, the broadcast of the message begins substantially at the beginning of the broadcast of the musical selection it identifies. The manner in which the receiver system 70 associates and stores received messages in conjunction with musical selections is related to the particular protocol selected for use with the transmitter system 10, as follows.

If the selected protocol is one where the message is broadcast prior to the broadcast of the associated musical selection, the processor 120 is configured to store the message contained in the temporary storage area, along with the portion of the selected musical selection.

If the selected protocol is one where the message is broadcast during the broadcast of the associated musical selection, the processor 120 is configured such that it stores the portion of the selected musical selection, and scans the temporary storage area for an EOM code. If one is found, this indicates that the desired message has been received in its entirety (recall that the processor 120 clears the temporary storage area upon receipt of an SOM code), and that message is stored in non-volatile memory in association with the stored musical selection. If no EOM code is found, the processor waits until such a code is received, and then stores that message in non-volatile memory in association with the stored musical selection.

If the selected protocol is one where the message is broadcast after the broadcast of the associated musical selection, the processor 120 is configured such that it clears the temporary storage area prior to storing the portion of the selected musical selection, and then scans that storage area for a newly received EOM code. When that code is received, the message stored in the temporary area is stored in the non-volatile area in association with the stored musical selection.

While a first embodiment of the invention has been disclosed, modifications and additions can be made to provide additional features. A second embodiment of the invention is provided in which the auxiliary data in the form of a digital text message is transmitted during periods of monophonic audio transmission to enable the use of higher levels of modulation for the transmission of such data.

As described above, the broadcast station transmits a plurality of stereophonic musical selections which are separated from each other by an interval of silence of about one second or more, or are separated by audio announcements of much longer duration. In this second embodiment, the broadcast mode during the intervals of silence or audio announcements is converted to monophonic transmission as follows, where it is presumed for the purpose of example that the message broadcast protocol used is that of broadcasting the message just prior to the associated musical selection.

Returning to FIG. 1, the start signal for instituting the transmission of the auxiliary data is provided on the line 60 during the interval of silence or audio announcement just prior to the stereophonic broadcast of the musical selection identified by that data. That start signal is also provided on line 154 to actuate a switch 156 which acts to connect together the left and right audio input lines 12 and 14. The effect of this connection is to convert the signals from the audio source to a monophonic signal, where the left and right channels are equal. In the case where the interval prior to the broadcast of the musical selection includes an audio announcement, the audio source may be a microphone or pre-recorded source. In the case where the interval is one of silence, there is no signal on the lines 12 and 14, and the switch 156 may additionally ground these two lines using line 158, to ensure null signals on these audio lines.

It will be appreciated that setting the signals on the lines 12 and 14 equal to each other reduces the L−R signal from the adder 22 (and hence the DSBSC signal on the line 31) to zero. Accordingly, the stereo pilot signal on the line 40 is not needed for purposes of receiver stereo demodulation during this interval. As a result, both the unmodulated amplitude and the level of AM modulation of the stereo pilot carrier may be increased over those levels used during stereophonic transmission.

For example, the amplitude of the unmodulated pilot can be increased by amplifier 42 to a value where it FM modulates the main carrier at a 20% level as opposed to the 9% level used during stereo broadcast. Further, the level of AM modulation of the pilot can be increased to say, 50% of the pilot signal (corresponding to an FM modulation range of 10 to 30% of the main carrier), as opposed to the 11% level (corresponding to an FM modulation range of 8 to 10% of the main carrier) used during stereo broadcast.

Figure 5:
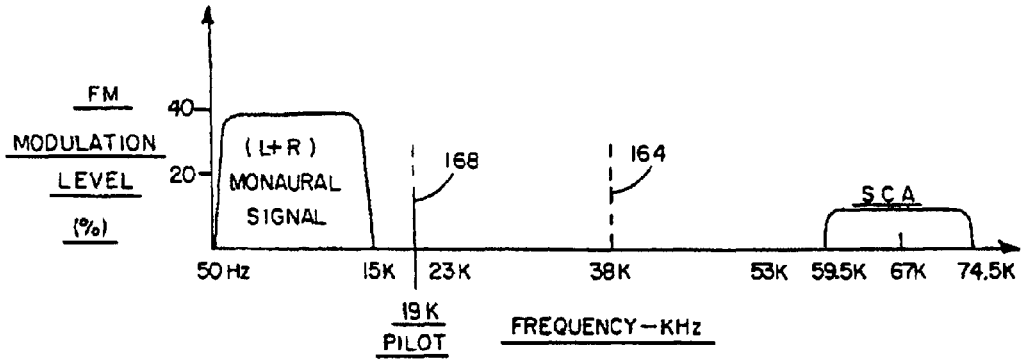
FIG. 5 is a graph showing the frequency spectra and relative modulation levels of the main station carrier in response to the various signals transmitted by the transmitter of FIG. 1 within the broadcast channel of an FM stereo broadcast station in accordance with a second embodiment of the invention which transmits auxiliary digital data during periods of monophonic audio transmission.
Figure 6:
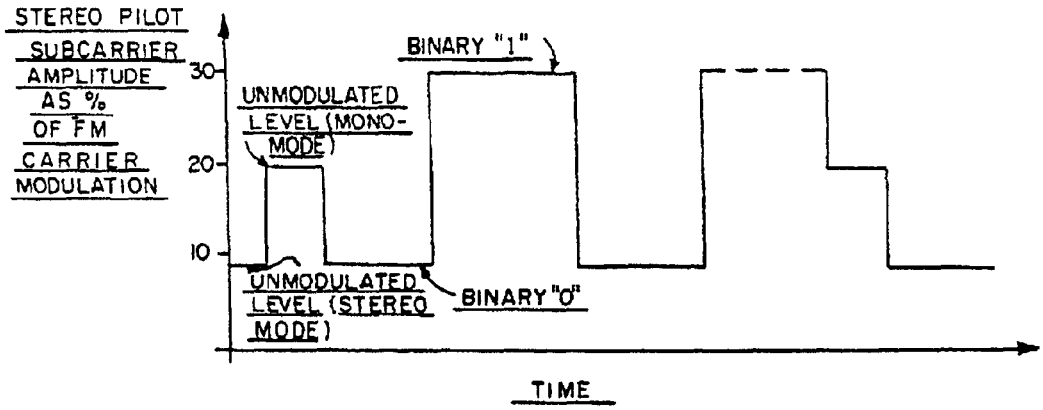
FIG. 6 is a graph showing the pulse amplitude modulation of the stereo pilot carrier in the time domain when used to transmit auxiliary digital data in accordance with the second embodiment of the invention.

The effects of these changes during monophonic broadcasting are shown in the frequency spectrum by the graph of FIG. 5, which may be compared to FIG. 2. Note the absence of the DSBSC signal, and the increase in amplitude and FM modulation levels (line 168) of the stereo pilot subcarrier. These stereo pilot signal modulation effects are shown in the time domain by the graph of FIG. 6, which may be compared to FIG. 3. These changes are accomplished by providing a steady state bias signal on the line 62 which boosts the unmodulated pilot subcarrier amplitude to the desired level during monophonic operation, and providing the pulses representing the digital message in sufficient amplitude to provide the desired AM modulation level of the pilot. The result of these changes is to provide a much higher signal-to-noise level in the transmission of the auxiliary data, as compared to the first embodiment. These changes do not adversely affect the operation of conventional FM stereo receivers, since the stereo pilot is not used or required for reception of monophonic broadcasts.

While particular amplitude and modulation levels have been described in relation to the stereo pilot in this configuration, it is contemplated that other levels may be used as well. For example, the unmodulated level of the stereo pilot could be further increased to effect a 30% FM modulation level of the main carrier, and the AM modulation level may be increase d up to 100% of the pilot signal.

At the completion of the broadcast of the auxiliary data, which occurs within the monophonic interval, the start signal is removed, and the transmission reverts back to stereophonic, whereby the musical selection is broadcast. This same technique can be used with the protocol where the message is broadcast in the interval following the musical selection which it identifies.

Figure 7:
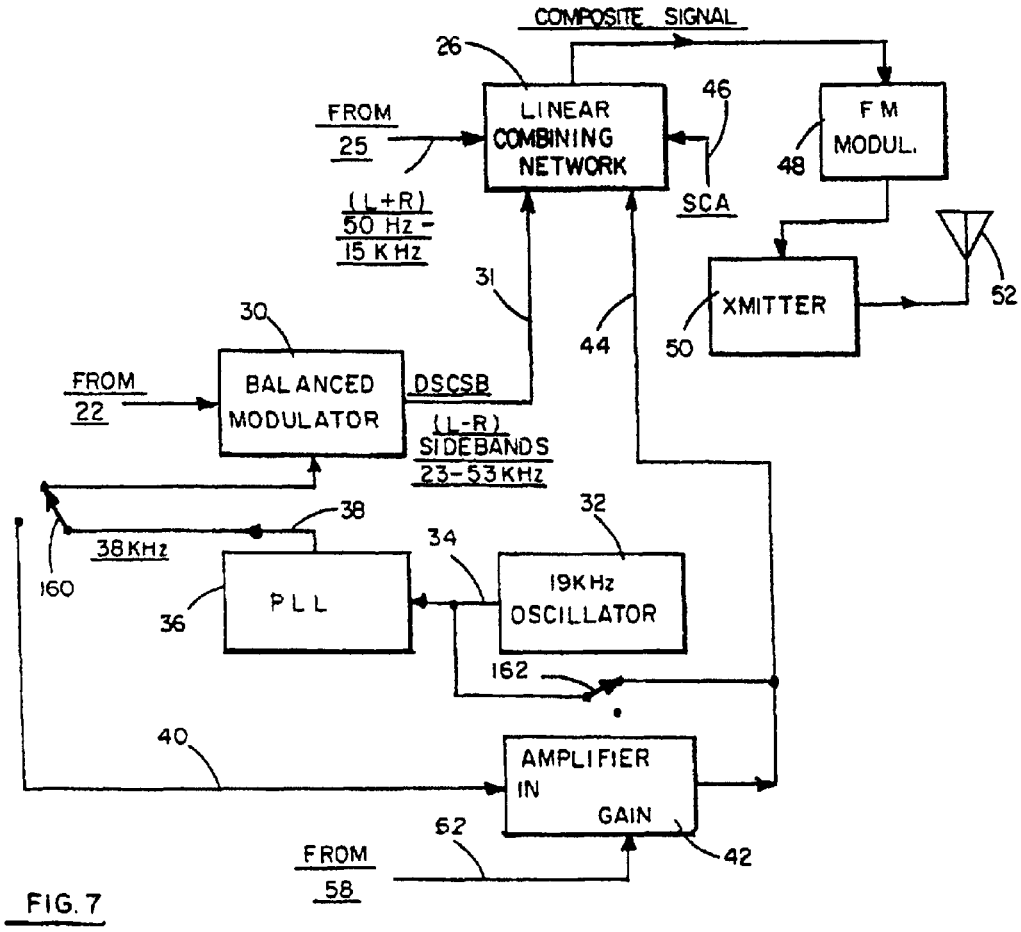
FIG. 7 is a functional block diagram showing a modification of the transmitter of FIG. 1 to pulse amplitude modulate a 38 kHz auxiliary data subcarrier to transmit auxiliary digital data during monophonic audio transmission.

In a modification of this embodiment, auxiliary data is again broadcast during monophonic transmission intervals, but the stereo pilot subcarrier is not used for this purpose. Instead, the 38 kHz subcarrier generated by the PLL 36 is transmitted in place of the stereo pilot (the transmission of which is suppressed), and is AM modulated with the auxiliary data. FIG. 7 shows the modifications to the system 10 to accomplish this objective. The start signal on the line 60 in FIG. 1 is used as described above to start the pulse code generation by the generator 58 and to actuate the switch 156 to set the audio channels 12 and 14 equal to each other. In addition, this signal is used to control switches 160 and 162 in FIG. 7 as follows.

The switch 160 is actuated to divert the 38 kHz carrier from the modulator 80 to the input terminal of the amplifier 42 via the line 40. The switch 162 is actuated to disconnect the stereo pilot signal from the network 26. In this configuration, the stereo pilot is not broadcast, and the DSBSC signal on the line 31 is a null signal as a result of the actuation of the switch 156. The 38 kHz signal on the line 40 is AM modulated by the amplifier 42 in response to the signal from the generator 58 on the line 62, and the resultant signal is provided via the line 44 to the network 26 from where it is used as a subcarrier to FM modulate the main carrier.

The dotted line 164 in FIG. 5 shows the presence of the 38 kHz subcarrier in the frequency spectrum of the main carrier during monophonic broadcasting, while the stereo pilot subcarrier (line 168) would not be present during this time. Since the 38 kHz subcarrier is not needed as a suppressed carrier for the DSBSC signal during monophonic broadcasts, it may be broadcast in place of the stereo pilot subcarrier, which is suppressed, and its amplitude and AM modulation levels may be set over a wide range by the signals from the generator 58 in conjunction with the amplifier 42 to broadcast the auxiliary data at high signal-to-noise levels. Thus the unmodulated level of the 38 kHz subcarrier may be set, for example, to a 20 to 40% FM modulation level of the main carrier, and may be AM modulated up to a level of 100%.

Figure 8:
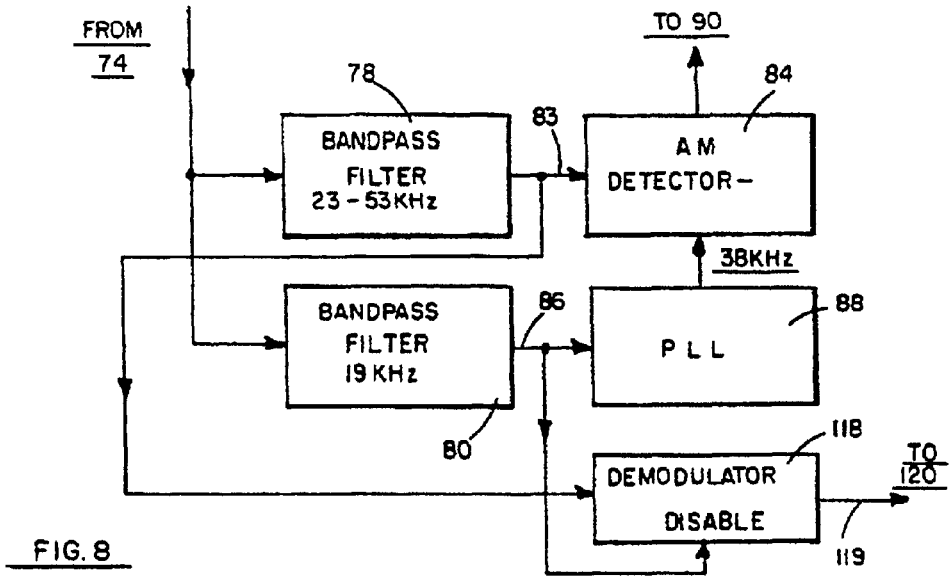
FIG. 8 is a functional block diagram showing a modification of the receiver of FIG. 4 to demodulate the auxiliary data subcarrier transmitted using the modification of FIG. 7.

FIG. 8 shows the modifications to the receiver system 70 of FIG. 4 to receive and demodulate the 38 kHz carrier. The output signal on the line 88 from the filter 78 is provided to an AM demodulator 170 which is used in place of, and may be similar in construction to the modulator 118, but which also includes a disable signal input terminal Which is connected to the line 86 to receive the stereo pilot signal as a disable signal. The output signal from the demodulator 170, which represents the pulse code sequence for the digital message, is provided to the data input terminal of the processor 120 on the line 119.

During monophonic operation, the absence of the stereo pilot signal disables the DSBSC detector 84, and enables the demodulator 170 Accordingly, no spurious audio signals are reproduced by the speakers 96 and 98 in response to the presence of the 38 kHz subcarrier, which is demodulated by the circuit 170, and the resultant message data is provided to the processor 120. This mechanization also does not disturb the operation of conventional FM stereo receivers, since the absence of the stereo pilot during monophonic operation also operates to disable the DSBSC detector 84 in these units.

While the above described system uses a 38 kHz subcarrier in place of the stereo pilot to broadcast the auxiliary data during monophonic transmission, it is envisioned that other subcarrier frequencies in the spectra above the frequency of the stereo pilot (19 kHz) and extending to and including the upper frequency of the DSBSC signal (53 kHz) may be used as well. Further, other amplitude modulation techniques may be employed to AM modulate the 38 kHz subcarrier, other than PAM modulation. For example, tone modulation techniques may be employed where the pulses from the code generator 58 modulate a tone signal which in turn AM modulates the subcarrier. Such techniques may be employed to decrease the response time of the circuits used in the AM demodulator 170.

Figure 9:
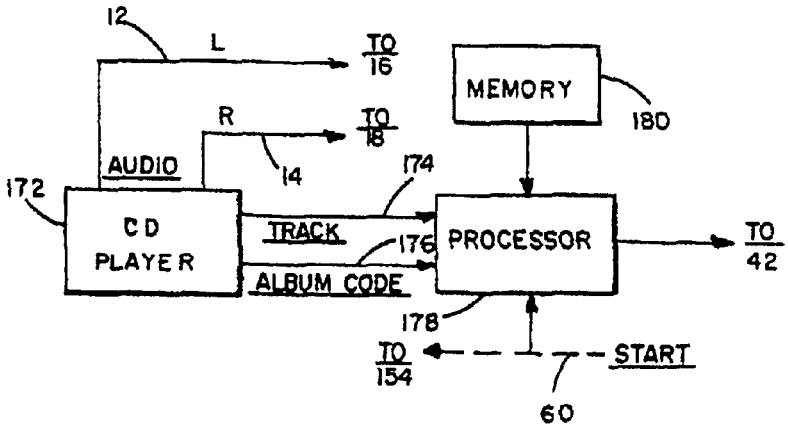
FIG. 9 is a functional block diagram showing the use of a compact disc player and a digital processor for automatically providing the auxiliary digital data signal for transmission by the transmitter of FIG. 1, where the data signal represents the title, artist and album corresponding to the musical selection being played by the player.

A system for implementing the functions of the data source block 54 and the code generator block 58 in FIG. 1 is shown in FIG. 9. As described above, the block 54 is used to provide a digital signal which contains the musical selection identifying data, preferably in the form of the title, artist and album name relating to that selection. In FIG. 9, there is shown a compact disc (CD) player 172 used as the source of the stereophonic audio signals provided on the lines 12 and 14 to the transmitter system Thus a stereo music selection is broadcast by inserting a particular CD in the player 172, and selecting a particular track to be played.

The majority of compact discs contain digitized data corresponding to an album of musical selections performed by a particular artist or artists. Each of the selections is provided on a separate track, which is selected by number. The compact disc also contains sub-tracks containing additional data such as the total number of tracks, and the time duration of each selection. Many CDs also contain a disk identification number, which can be thought of as an album code, and which can be used to uniquely identify that disc from other discs.

The player 172 provides separate output digital signals on the lines 174 and 176 which contain the track number selected, and the disc identification data, respectively. These signals are provided to input terminals of a digital processor 178, which may be in the form of a mini-computer, to which is connected a memory storage device 180 which may be in the form of a floppy or hard disk. Stored in this memory device is a table which lists the album identification codes for a plurality of CDs, along with the name of the album and the performing artist. Also stored in this table are the track numbers for each disc, and the name of the selection corresponding to that track. It is envisioned that the data in this table will be updated periodically as new CDs are released.

In response to the signals on the lines 174 and 176, the processor 178 provides a lookup function using the data in the stored table to determined the album name, artist name and musical selection title to be broadcast. This data is combined with suitable SOM, EOM and error correcting codes, which are assembled into the desired pulse code sequence and amplitudes to be provided to control the gain of the amplifier 42. In response to the start signal on the line 60 (also provided to the processor 178), the pulse code sequence is provided on the line 62 to the amplifier 42.

While there have been shown and described preferred embodiments of the present invention, it is not intended that the invention be limited solely to these embodiments. It is therefore to be understood that because various other embodiments may be devised by those skilled in the art without departing from the spirit and scope of the invention, it is the intention of the inventor to be limited only by the claims appended hereto.

What is claimed is:

1. [B] *A b*roadcast apparatus for automatically providing text information identifying a recorded broadcast audio selection *to a data receiver*, comprising:

compact disk player means for *decoding and* playing *data recorded on* a compact disk having *an album recorded thereon in the form of* multiple tracks each of which contains an audio selection, the *data on the compact* disk providing to the player means, in addition to the audio selection [a] digital code *data* which is unique to the audio selection [selected for play];

*track selection means for selecting a particular audio selection to be played;* digital processor means coupled to the player means *and responsive to the digital code data and the track selection means for processing digital data*;

[test] *text* storage means coupled to the digital processor means and having stored therein text information identifying a plurality of audio selections and digital codes, the text information being indexed by the digital codes;

means for automatically providing the digital code *data* from the player means to the processor means, whereby the processor means recalls from the storage means the text information corresponding to the provided digital code *data and, in response to the track selection means and the text information, provides digital data representing the text information identifying the selected audio selection*;

*data* transmitter means *including communications channel means for communicating data between two points,* for transmitting *on the communications channel means* the [recalled] text information at a time substantially [concurrent with] *prior to* the transmission of [the] *each* audio selection corresponding thereto; and

*data* receiver means for receiving *on the communications channel means* the *selected* audio selection and the text information, for reproducing the *selected* audio selection using audio transducer means, and for displaying the corresponding text information *on a display*.

2. The apparatus of claim 1 in which [the player means includes track selection means for selecting a particular track to be played; the digital code includes a track identification number identifying the track selected for play, and a disk identification number which uniquely identifies the disk from other compact disks;] the *plurality of* audio selections includes musical selections, and *further wherein* the text information includes [the] *a* name of each such *musical* selection and [the] *a* name of [the] *an* artist performing each such musical selection.

3. The apparatus of claim 1, in which the text information further includes [the] *a* name of [the] *an* album in which each such musical selection appears.

4. A method of automatically providing *to a data receiver* text information identifying a recorded broadcast audio selection, comprising the steps of:

providing a compact disk player for *decoding and* playing *data recorded on* a compact disk *having an album recorded thereon in the form of* multiple tracks each of which contains an audio selection, the *data on the* disk providing to the player in addition to the audio selection [a] digital code *data* which identifies the audio selection;

*providing track selection means for selecting a particular audio selection to be played;* providing a digital processor coupled to the player *and responsive to the digital code data and the track selection means for processing digital data*;

providing text storage means coupled to the digital processor and having stored therein text information identifying a plurality of audio selections and digital codes, where the text information is indexed in the text storage means by the digital codes;

providing automatically the digital code *data* from the player to the processor;

recalling from the storage means the text information corresponding to the provided digital code *data*;

*formatting, in response to the track selection means and the text information, digital data representing the text information identifying the selected audio selection;*

*providing a communications channel for communicating data between two points;* transmitting *on the communications channel* the text information at a time [substantially concurrent with] *prior to* the transmission of [the] *each* audio selection corresponding thereto;

receiving the *selected* audio selection and the text information;

reproducing *at the data receiver* the *selected* audio selection using audio transducer means; and displaying *on a display at the data receiver* the text information corresponding [thereto] *to the selected audio selection*.

5. The method of claim 4 in which the [step of providing the digital code includes providing a track identification number identifying the track selection for play and providing a disk identification number which uniquely identifies the disk from other compact disks; the stored] *plurality of audio selections are musical selections and the* text information includes [the disk identification code along with the] *a* name of [the] *an* artist performing the musical selections [on that disk], and [the] *a* name[s] of the musical[s] selections [contained on that disk along with the track on which each selection is contained].

6. The method of claim 5 in which the [stored test] *text* information further includes [the] *a* name of [the] *an* album in which the musical selection appears.

7. Apparatus for automatically providing [test] *to a data receiver* information corresponding to a recorded audio selection *originating on a compact disk*, comprising:

compact disk player means for *decoding and* playing *data recorded on* a compact disk having stored thereon [the] *an album in the form of multiple tracks, each of which contains an* audio selection, the *data on the* disk providing to the player means in addition to the audio selection [a] *digital* code *data* which is unique to that audio selection;

*track selection means for selecting a particular audio selection to be played;* processor means coupled to the player means *and responsive to the digital code data and the track selection means for processing digital data*;

[test] *text* storage means coupled to the processor means and having stored therein text information corresponding to a plurality of audio selections and *digital album* codes, the text information being indexed by the *digital album* codes;

means for automatically providing the *digital album* code *data* from the player means to the processor means, whereby the processor means recalls from the storage means the [test] *text* information corresponding to the provided *digital* code *data*, and *in response to the track selection means and the identified text information, provides formatted digital data representing the text information identifying the selected audio selection;*

*data receiver means remote from the compact disk player means for receiving digital data;*

*communication means for establishing a communications link to the data receiver, and for communicating the text information prior to the transmission of each corresponding audio selection to the data receiver; and* display means located at [a] *the* remote receiving site for displaying the [recalled] text information at a time substantially concurrent with the reproduction of the *selected* audio selection by the player means.

[8. The apparatus of claim 7 further including:

transmitter means for transmitting the recalled text information and the audio selection corresponding thereto; and receiver means for receiving the audio selection and the text information, for reproducing the audio selection using audio transducer means, and for displaying the corresponding text information.]

[9. The apparatus of claim 8 in which the text information is transmitted substantially concurrent with the transmission of the audio selection.]

[10. The apparatus of claim 8 in which the received audio selection is reproduced substantially concurrent with the display of the corresponding text information.]

11. The apparatus of claim 7 in which the *selected* audio selection is a musical selection, and the text information includes [the] *a* name of the *musical* selection.

[12. The apparatus of claim 7 in which the compact disk player means includes means for playing a compact disk having multiple tracks each of which contains an audio selection, and track selection means for selecting a particular track to be played; the code includes a track identification number identifying the track selected for play, and a disk identification number which uniquely identifies the disk from other compact disks.]

13. The apparatus of claim [8] *7* where the text information [recalled by the processor means] is in the form of an encoded digital message signal [which is transmitted by the transmitter means;] and the receiver means includes means for decoding the received digital message signal into the text [message] *information*.

14. A method for automatically providing *to a data receiver* text information corresponding to a recorded audio selection *originating on a compact disk*, comprising the steps of:

providing compact disk player means for *decoding and* playing *data recorded on* a compact disk having stored thereon [the] *an album in the form of multiple tracks, each of which contains an* audio selection, the *data on the* disk providing *to* the player means in addition to the audio selection [a] *digital* code *data* which is unique to that audio selection;

*providing track selection means for selecting a particular audio selection to be played;* providing processor means coupled to the player means *and responsive to the digital code data and the track selection means for processing digital data*;

providing text storage means coupled to the processor means and having stored therein text information corresponding to a plurality of audio selections and *digital* codes, the text information being indexed by the *digital* codes;

providing the *digital* code *data* automatically [form] *from* the player means to the processor means, whereby the processor means recalls from the storage means the text information corresponding to the provided *digital* code[, and] *data;*

*formatting, in response to the track selection means and the identified text information, digital data representing the text information identifying the selected audio selection;*

*providing data receiver means remote from the compact disk player means for receiving digital data;*

*providing communication means for establishing a communications link to the data receiver, and for communicating the text information and corresponding selected audio selection to the data receiver;* displaying at [a] *the* remote receiving site the [recalled] text information at a time substantially concurrent with the reproduction of the *selected* audio selection by the player means.

[15. The method of claim 14 further including the steps of:

transmitting the recalled text information and the audio selection corresponding thereto;

receiving the audio selection and the text information;

reproducing the audio selection using audio transducer means; and displaying the corresponding text information.]

[16. The method of claim 15 in which the text information is transmitted substantially concurrent with the transmission of the audio selection.]

[17. The method of claim 15 in which the received audio selection is reproduced substantially concurrent with the display of the corresponding text information.]

18. The method of claim 14 in which the *selected* audio selection is a musical selection, and the text information includes [the] *a* name of the *musical* selection.

[19. The method of claim 14 in which the compact disk player means includes means for playing a compact disk having multiple tracks each of which contains an audio selection, and track selection means for selecting a particular track to be played; the cod includes a track identification number identifying the track selected for play, and a disk identification number which uniquely identifies the disk from other compact disks.]

20. The method of claim [15] *14* where the [transmitted] text information [recalled by the processor means] is in the form of an encoded digital message signal; and the [step of receiving] *data receiver* includes the step of decoding the received *encoded* digital message signal into the text [message] *information*.

*21. The apparatus of claim 1 wherein the data receiver means further includes:*

*storage means for storing the selected audio selection and the text information corresponding thereto; and*

*recall means for recalling the selected audio selection and the text information, whereby the selected audio selection may be played while the text information is displayed, at a time when the data receiver means is no longer receiving data from the data transmitter means.*

*22. The apparatus of claim 21 wherein multiple audio selections and corresponding text information may be stored and recalled in the data receiver means.*

*23. The apparatus of claim 21 wherein the data receiver means further includes deletion means for deleting from memory stored selections and text information.*

*24. The apparatus of claim 21 wherein the data receiver means further includes an indication to the user of the*

*amount of unused memory available for the storage of additional audio selections and corresponding text information.*

*25. The apparatus of claim 24 where the indication is a visual indication.*

*26. The apparatus of claim 1 wherein the data receiver means further includes:*

*storage means for storing the received text information; and*

*recall means for recalling the stored text information, whereby the text information may be displayed at a time when the data receiver means is no longer communicating with the data transmitter means.*

*27. The apparatus of claim 1 wherein the data receiver means is portable.*

*28. The apparatus of claim 1 wherein the communications channel means is wireless.*

*29. The apparatus of claim 1 wherein the text information is transmitted immediately prior to the transmission of the selected audio selection corresponding thereto.*

*30. The apparatus of claim 1 wherein the text information is transmitted immediately after the transmission of the selected audio selection corresponding thereto.*

*31. The apparatus of claim 1, wherein the digital code data is album code data that is unique to the album.*

*32. The method of claim 4 wherein the data receiver further includes the steps of:*

*storing the received audio selection and the text information corresponding thereto; and*

*recalling the stored audio selection and text information, whereby the audio selection may be played while the text information is displayed, at a time when the data receiver is not receiving data from the communications channel.*

*33. The method of claim 32 further including the steps of storing and recalling in the data receiver multiple audio selections and corresponding text information.*

*34. The method of claim 32 further including the step of deleting from memory stored selections and text information.*

*35. The method of claim 32 wherein the data receiver further includes the step of providing an indication to the user of the amount of unused memory available for the storage of additional audio selections and corresponding text information.*

*36. The method of claim 35 where the indication is a visual indication.*

*37. The method of claim 4 wherein the data receiver further includes the steps of:*

*storing the received text information; and*

*recalling the stored text information, whereby the text information may be displayed at a time when the data receiver is disconnected from the communications channel.*

*38. The method of claim 4 wherein the data receiver is portable.*

*39. The method of claim 4 wherein the communications channel is wireless.*

*40. The method of claim 4 wherein the text information is transmitted immediately prior to the transmission of the selected audio selection corresponding thereto.*

*41. The method of claim 4, wherein the digital code data is album code data that is unique to the album.*

*42. The apparatus of claim 7 wherein the data receiver means further includes:*

*storage means for storing the received audio selection and the text information corresponding thereto; and*

*recall means for recalling the stored audio selection and text information, whereby the audio selection may be played while the text information is displayed, at a time when the data receiver means is no longer receiving data from the communication means.*

*43. The apparatus of claim 42 wherein multiple audio selections and corresponding text information may be stored and recalled in the data receiver means.*

*44. The apparatus of claim 42 wherein the data receiver means further includes deletion means for deleting from memory stored selections and text information.*

*45. The apparatus of claim 42 wherein the data receiver means further includes an indication to the user of the amount of unused memory available for the storage of additional audio selections and corresponding text information.*

*46. The apparatus of claim 45 where the indication is a visual indication.*

*47. The apparatus of claim 7 wherein the data receiver means further includes:*

*storage means for storing the received text information; and*

*recall means for recalling the stored text information, whereby the text information may be displayed at a time when the data receiver means is no longer communicating with the data transmitter means.*

*48. The apparatus of claim 7 wherein the data receiver means is portable.*

*49. The apparatus of claim 7 wherein the communications channel means is wireless.*

*50. The apparatus of claim 7 wherein the text information is transmitted immediately after the transmission of the audio selection corresponding thereto.*

*51. The apparatus of claim 7, wherein the digital code data is album code data that is unique to the album.*

*52. The method of claim 14 wherein the data receiver means further includes the steps of:*

*storing the received audio selection and the text information corresponding thereto; and*

*recalling the stored audio selection and text information, whereby the audio selection may be played while the text information is displayed, at a time when the data receiver means is not receiving data from the communications channel.*

*53. The method of claim 52 further including the steps of storing and recalling in the data receiver means multiple audio selections and corresponding text information.*

*54. The method of claim 52 further including the step of deleting from memory stored selections and text information.*

*55. The method of claim 52 wherein the data receiver means further includes the step of providing an indication to the user of the amount of unused memory available for the storage of additional audio selections and corresponding text information.*

*56. The method of claim 55 where the indication is a visual indication.*

*57. The method of claim 14 wherein the data receiver means further includes the steps of:*

*storing the received text information; and*

*recalling the stored text information, whereby the text information may be displayed at a time when the data receiver means is not receiving data from the communications channel.*

*58. The method of claim 14 wherein the data receiver means is portable.*

*59. The method of claim 14 wherein the communications channel is wireless.*

*60. The method of claim 14 wherein the text information is transmitted immediately after the transmission of the selected audio selection corresponding thereto.*

*61. The method of claim 14, wherein the digital code data is album code data that is unique to the album.*

* * * * *